(12) United States Patent
Dhaini

(10) Patent No.: US 10,384,565 B2
(45) Date of Patent: Aug. 20, 2019

(54) ADJUSTABLE SEAT ASSEMBLY

(71) Applicant: Lear Corporation, Southfield, MI (US)

(72) Inventor: Wissam Dhaini, Lapu-Lapu (PH)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/223,863

(22) Filed: Jul. 29, 2016

(65) Prior Publication Data
US 2018/0029503 A1 Feb. 1, 2018

(51) Int. Cl.
*B60N 2/02* (2006.01)
*B60N 2/64* (2006.01)
(Continued)

(52) U.S. Cl.
CPC ........... *B60N 2/0244* (2013.01); *B60N 2/646* (2013.01); *B60N 2/66* (2013.01); *A47C 7/285* (2013.01);
(Continued)

(58) Field of Classification Search
CPC . B60N 2/44; B60N 2/68; B60N 2/646; B60N 2/52; B60N 2/00; B60N 2/505; B60N 2/60; B60N 2/0244; B60N 2/66; B60N 2/4415; B60N 2/686; B60N 2/50; B60N 2/525; B60N 2/002; B60N 2/6027; B60N 2/6036; B60N 2/6063; B60N 3/00; B60N 2/0232; B60N 2/0248; B60N 2/0252; B60N 2/0276; B60N 2/067; B60N 2/28; B60N 2/2806; B60N 2/2863; B60N 2/4829; B60N 2/4852; B60N 2/4885; B60N 2/853; B60N 2/888; B60N 2/829; B60N 2/015; B60N 2/62; B60N 2/914; B60N 2/1814; B60N 2/161; B60N 2/1635; B60N 2/39; B60N 2/7035; B60R 21/16; B60R 21/01526; B60R 21/015; B60R 21/01554; B60R 21/01536; B60R 21/01516; B60R 21/01542; G01G 19/4142; G01G 23/3728; G01S 15/87; G01S 15/88; B64D 11/0647; B64D 11/06
See application file for complete search history.

(56) References Cited

U.S. PATENT DOCUMENTS

| 5,758,924 A | 6/1998 | Vishey |
| 6,098,000 A | 8/2000 | Long et al. |

(Continued)

FOREIGN PATENT DOCUMENTS

| CN | 103097182 A | 5/2013 |
| CN | 203766568 U | 8/2014 |

(Continued)

OTHER PUBLICATIONS

Office Action dated Jan. 29, 2019 for Chinese Application No. 2017106200768, 18 pages.

*Primary Examiner* — Behrang Badii
(74) *Attorney, Agent, or Firm* — Brooks Kushman P.C.

(57) ABSTRACT

A seat assembly is provided having a seat bottom and a seat back mounted adjacent the seat bottom. A cushion is disposed on at least one of the seat bottom and seat back and defines a seating surface. The seating surface has a plurality of regions. A controller is in communication with the cushion and is programmed to independently vary a stiffness of each of the regions along the seating surface.

9 Claims, 4 Drawing Sheets

(51) Int. Cl.

| | | |
|---|---|---|
| *B60N 2/66* | (2006.01) | |
| *B60N 2/58* | (2006.01) | |
| *B60N 2/62* | (2006.01) | |
| *B60N 2/50* | (2006.01) | |
| *B60N 2/70* | (2006.01) | |
| *B60N 2/90* | (2018.01) | |
| *A47C 7/28* | (2006.01) | |
| *A47C 7/30* | (2006.01) | |

(52) U.S. Cl.
CPC .............. *A47C 7/30* (2013.01); *B60N 2/0232* (2013.01); *B60N 2/505* (2013.01); *B60N 2/58* (2013.01); *B60N 2/62* (2013.01); *B60N 2/665* (2015.04); *B60N 2/7088* (2013.01); *B60N 2/914* (2018.02); *B60N 2002/0268* (2013.01)

(56) References Cited

U.S. PATENT DOCUMENTS

| | | | |
|---|---|---|---|
| 6,398,303 B1 | 6/2002 | Herrmann et al. | |
| 7,815,219 B2 * | 10/2010 | Breed | B60N 2/002 |
| | | | 280/735 |
| 8,348,339 B2 | 1/2013 | Onuma et al. | |
| 8,616,654 B2 | 12/2013 | Zenk et al. | |
| 8,958,955 B2 | 2/2015 | Hotary et al. | |
| 9,238,426 B2 | 1/2016 | Hofp et al. | |
| 2007/0118259 A1* | 5/2007 | Chernoff | B60N 2/002 |
| | | | 701/36 |
| 2009/0099490 A1 | 4/2009 | Durt et al. | |
| 2009/0195038 A1* | 8/2009 | Underwood | A47C 7/503 |
| | | | 297/301.2 |
| 2009/0250983 A1* | 10/2009 | Maier | B60N 2/062 |
| | | | 297/232 |
| 2010/0253119 A1* | 10/2010 | Nagata | B60N 2/58 |
| | | | 297/216.1 |
| 2011/0004371 A1* | 1/2011 | Bullard | A47C 7/285 |
| | | | 701/36 |
| 2011/0272993 A1* | 11/2011 | Kilincsoy | D04B 21/14 |
| | | | 297/452.41 |
| 2012/0200947 A1* | 8/2012 | Hopkins | G02B 7/004 |
| | | | 359/819 |
| 2013/0285426 A1* | 10/2013 | Arant | B60N 2/62 |
| | | | 297/284.1 |
| 2014/0097661 A1* | 4/2014 | Loher | B60N 2/914 |
| | | | 297/452.41 |
| 2014/0333107 A1* | 11/2014 | Seki | B60N 2/62 |
| | | | 297/284.1 |
| 2015/0209206 A1 | 7/2015 | Bargellini et al. | |
| 2015/0210192 A1* | 7/2015 | Benson | B60N 2/914 |
| | | | 297/217.2 |
| 2015/0216309 A1* | 8/2015 | Habing | A47C 3/0255 |
| | | | 472/118 |
| 2015/0251573 A1* | 9/2015 | Misch | B60N 2/665 |
| | | | 297/452.41 |
| 2015/0351692 A1 | 12/2015 | Pereny et al. | |
| 2015/0352979 A1 | 12/2015 | O'Bannon et al. | |
| 2015/0352990 A1 | 12/2015 | Zouzal et al. | |
| 2016/0068089 A1* | 3/2016 | Huebner | B60N 2/60 |
| | | | 297/228.13 |
| 2016/0207429 A1* | 7/2016 | Fitzpatrick | B60N 2/646 |

FOREIGN PATENT DOCUMENTS

| | | |
|---|---|---|
| DE | 102008014628 A1 | 9/2009 |
| JP | 2013189142 A | 9/2013 |
| KR | 20140037480 A | 3/2014 |
| TW | M477405 U | 5/2014 |
| WO | 2015017277 A1 | 2/2015 |

* cited by examiner

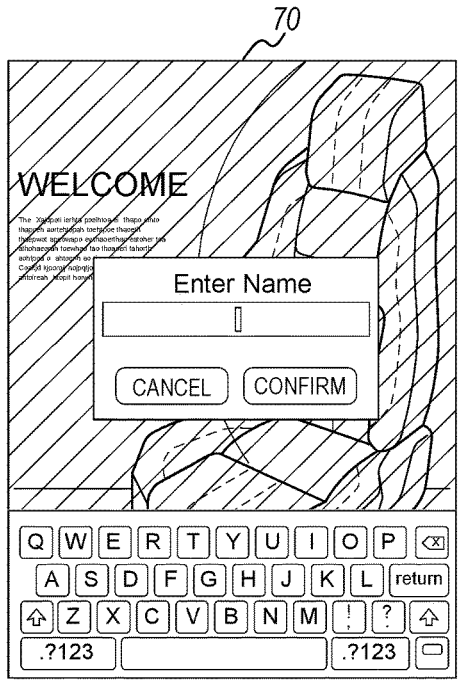
FIG. 4
FIG. 5
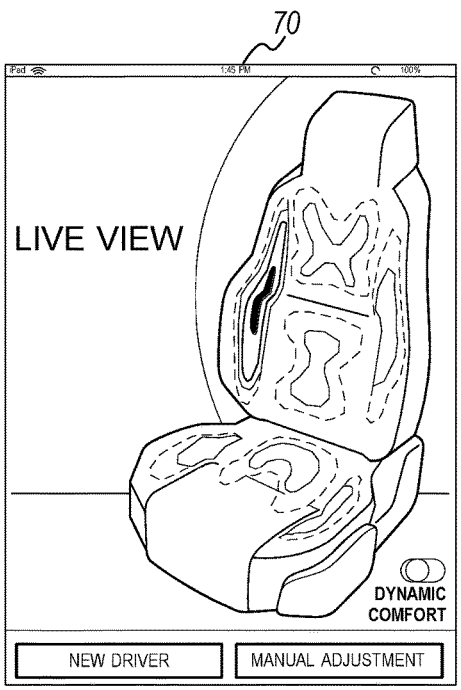
FIG. 6
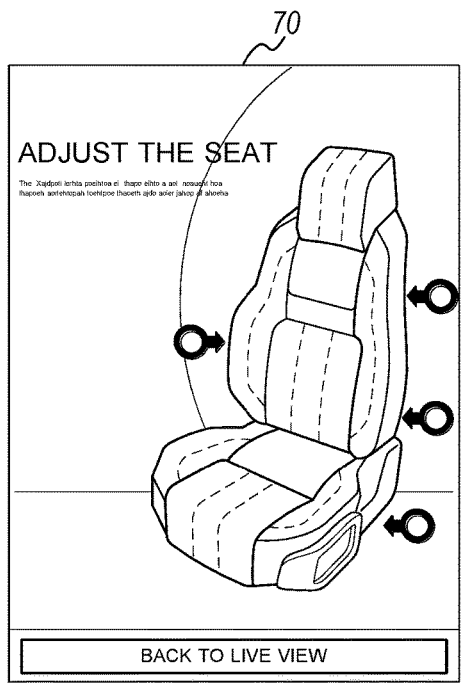
FIG. 7

US 10,384,565 B2

ADJUSTABLE SEAT ASSEMBLY

TECHNICAL FIELD

Various embodiments relate to adjustable seat assemblies.

BACKGROUND

An adjustable seat assembly is illustrated and described in U.S. Pat. No. 5,758,924, which issued on Jun. 2, 1998 to Lear Corporation.

SUMMARY

According to at least one embodiment, a seat assembly is provided having a seat bottom and a seat back mounted adjacent the seat bottom. A cushion is disposed on at least one of the seat bottom and seat back and defines a seating surface. The seating surface has a plurality of regions. A controller is in communication with the cushion and is programmed to independently vary a stiffness of each of the regions along the seating surface.

According to another embodiment, a plurality of sensors is operably connected to the cushion and in electrical communication with the controller to detect a seating position of an occupant. The controller is programmed to dynamically vary the stiffness of the cushion in response to a sensed change in the seating position of the occupant.

According to another embodiment, the plurality of regions includes a plurality of foam cells formed in the cushion. The stiffness in each of the foam cells is variable independently based on an air pressure in each foam cell.

According to another embodiment, the seat assembly includes a rigid pan having a plurality of pan cells. The stiffness in each of the regions is variable independently when each of the pan cells is actuated.

According to another embodiment, the stiffness of the cushion in each of the regions is dynamically varied based on an external condition.

According to another embodiment, the external condition is based on destination information.

According to another embodiment, the destination information includes at least one of a travel distance, a travel time, a road condition and an external temperature.

According to another embodiment, the external condition is based on occupant data.

According to another embodiment, the occupant data includes at least one of an occupant age, gender, health condition, weight and psychological condition.

According to another embodiment, the cushion includes at least one adjustable bolster portion, wherein the controller is programmed to dynamically adjust a position of the bolster portion.

According to at least one other embodiment, a method for adjusting a seat assembly is provided. Data indicative of an external condition of the seat assembly is received. The stiffness of a plurality of regions along a seating surface of a seat cushion is independently varied based on the external condition.

According to at least one other embodiment, a seat assembly is provided having a seat bottom and a seat back mounted adjacent the seat bottom. A cushion is disposed on at least one of the seat bottom and seat back to define a seating surface. The seating surface has a plurality of regions. A controller is in communication with the cushion and is programmed to independently vary a comfort condition in each of the regions along the seating surface.

According to another embodiment, the comfort condition comprises a cushion stiffness, wherein the controller is programmed to independently vary the cushion stiffness of each of the regions along the seating surface.

According to another embodiment, the comfort condition comprises a surface temperature, wherein the controller is programmed to independently vary the surface temperature of the regions along the seating surface.

According to another embodiment, the comfort condition in each of the regions is dynamically varied based on an external condition.

BRIEF DESCRIPTION OF THE DRAWINGS

FIG. 4 is an interface and display image for a vehicle seating system of FIG. 1 according to an embodiment;

FIG. 5 is another interface and display image for the vehicle seating system of FIG. 1;

FIG. 6 is another interface and display image for the vehicle seating system of FIG. 1;

FIG. 7 is another interface and display image for the vehicle seating system of FIG. 1;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
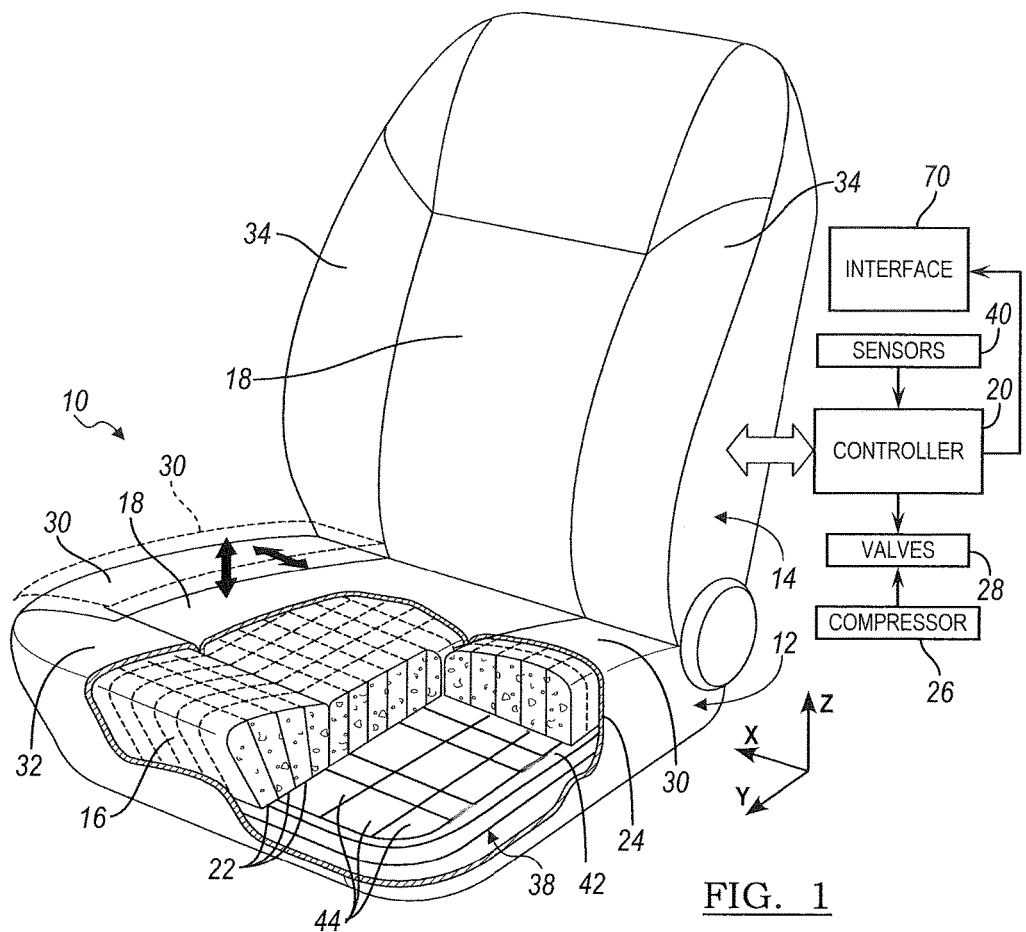
FIG. 1 is a front perspective view of a vehicle seat assembly, illustrated with a section view of a portion of the seat assembly, according to an embodiment.

FIG. 1 illustrates the vehicle seat assembly 10 with a cover removed. The seating system can be employed in original equipment for vehicles or in aftermarket products. Applicable markets include automotive, mass transit, airlines, etc., as well as non-vehicular seating such as office, home, commercial, and public venue seating. The seat assembly 10 includes a seat bottom 12 adapted to be mounted adjustable translation in a fore and aft direction and in an up and down direction of a vehicle.

The seat assembly 10 includes a seat back 14 pivotally connected to the seat bottom 12 to extend generally upright relative to the seat bottom 12 for pivotal adjustment relative to the seat bottom 12. A head restraint (not shown) is mounted for adjustable translation to the seat back 14.

The seat bottom 12 and seat back 14 include an intelligent foam cushion 16 that forms the seating surfaces 18 of the seat assembly. The intelligent foam cushion 16 adjusts the foam stiffness at different regions along the seating surface 18. The foam cushion 16 may have a preset foam stiffness. But the stiffness of the foam cushion 16 is variable along the seating surface 18 so that the stiffness may be increased or decrease based on numerous parameters to maintain the occupant's comfort, posture and wellness over time even as the parameters change. A trim material 24 covers the foam cushion 16 along at least the seating surface. The trim material 24 may be any suitable trim cover type including fabric or leather.

The foam cushion 16 includes a plurality of foam cells 22. Each of the foam cells 22 is controllable to have a variable stiffness. The foam cells 22 may be defined as any suitable size. The foam cells 22 may form a grid or specified pattern along the seating surface 18 to control the foam stiffness in particular regions.

The stiffness of each of the foam cells 22 may be varied by varying a supply of air to each of the foam cells 22. At least one compressor 26 provides a source of air to the seat assembly 10 and is in fluid communication with the foam cells 22. A plurality of valves 28 receive the compressed air and are controlled by a controller 20 for regulating compressed air into and out of the seat assembly 10. The plurality valves 28 allow independent control of the stiffness in each foam cell 22. For example, the seat assembly may include one valve for each cell 22.

The foam cells 22 may each have different dimensions and can receive different amount of air pressure. The foam cushion 16 may be a combination of foam material where the air density can be controlled to allow highest comfort values based on given and known boundary conditions.

The air compressor 26 may be integrated directly in the seat assembly 10. The air compressor 26 may be in electric communication with the sensors 40 such that the compressor 26 is controlled based on signals from the sensors 40. The air compressor 26 may also be integrated in the air conditioning system of the vehicle allowing the air temperature and the air pressure inside the foam cells 22 to be adjusted which has an impact on the air density and the seat stiffness as well as the surface temperature.

The valves 28 may be housed in the seat back 14 or under the seat bottom 12. The compressor 26 may be provided in the seat back 14, the seat bottom 12 or concealed within the vehicle body. The controller 20 may be provided in a module under the seat bottom 12, and may be a multifunction controller that also controls other functions in the vehicle.

In another embodiment, the stiffness of the foam cushion 16 may be varied mechanically by having a rigid pan 42 with a plurality of individually controllable pan cells 44, as shown in FIG. 1. The rigid pan 42 may vary the stiffness when each of the pan cells 44 applies varying contact forces to the cushion 16. The rigid pan may be disposed below the cushion 16. The foam cushion 16 is positioned above the pan cells 44 and will transfer the recommended contact pressure to the occupant. The contact pressure to the occupant may be controlled by sensors. The rigid pan 42 may be formed of a metal sheet or other suitable material. The pan cells 44 may be controlled with the controller 20 and actuators such as the compressor 26 and pneumatic actuator 28, or any other suitable actuators.

The rigid pan 42 may be used alone or combined with the foam cells 22 where the stiffness can be adjusted through the foam cells 22 only independent from the rigid pan 42, through the rigid pan 42 only, or by a combination of the foam cells 22 and rigid pan 42. The foam cells 22 can adjust their position along the pan 42 controlled by an intelligent system for an optimized foam stiffness distribution along the seat surface.

The seat bottom 12 and seat back 14 also include adjustable support structures. In one embodiment, the seat bottom 12 includes adjustable side bolster 30 and an adjustable front bolster 32. The side bolsters 30 on the seat bottom 12 may be adjusted in both the lateral direction X as well as the upright direction Z relative to a central cushion 36 to provide varying support to the seated occupant. The front support 32 may be moved in the upright direction Z and fore-aft direction Y. The side bolsters 34 on the seat back 14 may be adjust in the lateral direction X and the fore-aft direction Y. A mechanism disposed inside the seat allows the seat support structures 30, 32, 34 to be adjusted. For example, a bracket may be mounted to the support structure such as the side bolster 30 and the bracket may be attached to the seat frame 38 to translate the bolster.

In another embodiment, the adjustable support structures 30, 32, 34 may be formed of a combination of foam and rubber. The rubber is resilient and will elastically expand as the foam fills with air. The rubber will spring-back when the air is emptied from foam and the adjustable support structures 30, 32, 34 will return to their original shape and position.

The traditional definition for seating comfort is based on an instant pressure level along the seating surface. But this traditional comfort definition is not accurate enough to give a clear conclusion about the comfort quality level of a seat for an occupant.

The human body consists of different body parts with different material properties each having different stiffness and interaction with the seat assembly. A male or female occupant or a young or old occupant will have different interaction with the seat structure due to differences in the body parts due to gender or age. Traveling for long periods of time may also change the way the body interacts with the seats. The seat structure might feel good in the first minutes or hours but after travelling for a longer time it will become uncomfortable and could even cause some damage on the occupant's biomechanical structure.

During long travel times, the occupant's blood pressure or blood flow might be affected causing the blood flow restriction and tenderness in some body parts. As a result, the occupant tends to adjust their position from time to time. In a traditional seat, the seat foam stiffness will remain generally constant during the traveling period of time, but the human muscles will not as the muscle fiber become weaker and tired and the balance which that existed between the body muscles and the seat will become unstable. When this happens, the occupant will start to feel uncomfortable and may need to stretch or move to allow the muscle fibers to relax and change blood flow. Having a seat that has a cushion with variable stiffness control (VSC) can minimize such types of occupant discomfort.

Figure 2:
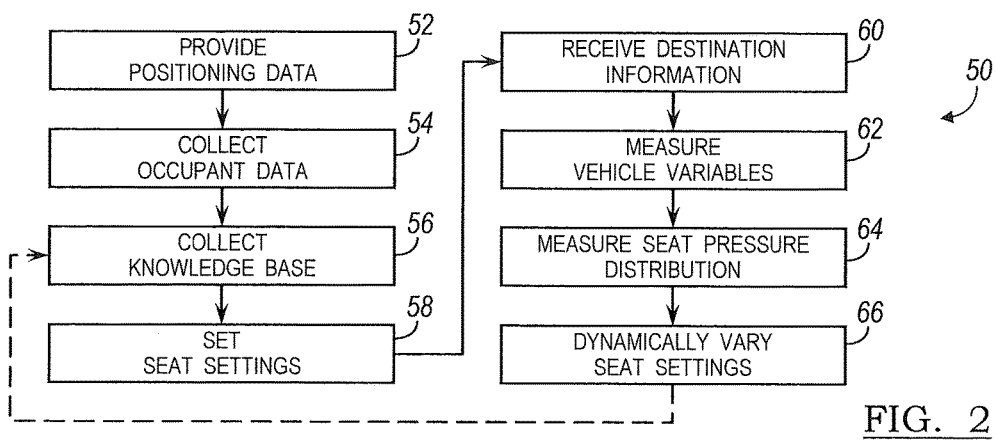
FIG. 2 is a flowchart of a method for adjusting the vehicle seat according to an embodiment.

FIG. 2 illustrates a method 50 of controlling the seat assembly 10 to maintain the occupant's comfort, even over long trips. The flowchart in FIG. 2 illustrates the method 50 for determining various adjustment positions of a vehicle seat assembly for various users under various conditions. Positioning data is provided at block 52. The positioning data 52 may include expert positioning of occupants for optimal comfort, posture and/or wellness by a doctor or chiropractor. The positioning data 52 can be used at specific sites on an ongoing basis if required. The positioning data may also include constant data about the seat such as whether the seating surface material is leather or fabric, and vehicle information regarding the suspension settings and wheels, for example. The positioning and expert data input provides a high level of expert comfort, posture and personalized fitting.

At block 54, occupant data is collected. The occupant data may include any information based on the occupant or defined by the occupant. The occupant data may include the age, weight and gender of the occupant. The occupant data may also include the occupant's body dimensions. Further, the occupant may provide data about health issues. Psychological state or body condition of the occupant may also be included in the occupant data collected at block 54. The occupant data may be based on anthropometry, body pressure distribution (BPD), sensor data, status of actuators (such as pressure of inflatable air bladders, status of valves, or the like), or other data that provides a comfort, posture and biomechanically optimized position of an adjustable vehicle seat assembly.

The occupant data may be collected via an input screen or user interface 70, as illustrated in FIG. 4, for example. FIG. 4 illustrates an example of an input screen where occupant data is input, such as biometric, personal health, wellness and activity level data. Of course, any occupant data may be input in various input screens. An interface 70 is also provided with the seat assembly 10. The interface 70 may be integrated into the vehicle, such as an instrument panel display. The interface 70 may be remote, such as a personal digital assistant (PDA) including phones, tablets and the like. The interface 70 may be provided as a smart phone application, wherein users enter relevant information or physical characteristics about themselves. The smart phone interface may not require on-site expertise or seat properties. The remote interface permits a user to transport settings to each vehicle, such as personal passenger vehicles, airline seating, rental cars, and the like. The interface 70 may be wired or wireless communication with the controller 20. The data may also be input from an interface 70 that is provided in the vehicle. The interface 70 may be integrated into the vehicle, such as an instrument panel display that is in wired or wireless communication with the controller 20.

At block 56, the positioning data and occupant is collected in a knowledge base or table for setting adjustments based on categories of data. The knowledge base may be compiled from the expert positioned data and the occupant specific data.

The knowledge base may be utilized for determining pre-set options and seating settings, as shown in block 58. Various setting options may be provided for various types of driving and may be selected by the occupant. For example a touring setting may provide per package settings and basic comfort, posture and biomechanically optimized seating position recommendations. The touring setting may also provide optimal visibility, use of features and controls, and the like. A performance setting may be provided for active drivers to provide a more erect position with firmer seating. Additionally, a luxury setting may be more reclined with softer seating. The knowledge base may also be utilized for setting customized seating settings by a user at a controller or interface 70.

At block 60, the destination information is received. The destination information may be input by the occupant such as the driver via the interface 70, for example or may be received from a navigation system. The destination information may include the target driving time and distance for determining if the trip will be long distance travel or short distance travel. The destination information may include other information about the destination such as weather, including temperature and wind, for example, as well as other destination specific information.

Vehicle and seat variables are also measured, at block 62. For example, the driving velocity, vehicle altitude, outside temperature and inside temperature are measured through various sensors provided on the vehicle. The road quality may also be determined based on input from a vibration sensor, for example. The temperature of the seat assembly 10 or internal temperature of the vehicle may also be measured.

The cushion 16 may include pressure sensors 40 to detect pressure distribution along the seating surface 18. Any pressure sensor is contemplated, such as a pneumatic pressure sensor or contact pressure sensors disposed on a front or rear surface of the cushion. The contact pressure sensors may include pressure-sensing mats, such as Tekscan®. At block 64, the controller receives an occupant pressure distribution from the sensors 40. The pressure distribution may be displayed on the interface 70, such as in FIG. 6. Pressure values may also be displayed as a range of colors.

Based on the data received and input in blocks 52, 54, 56, 58, 60, 62 and 64, the seat assembly 10 is dynamically controlled for intelligent seat comfort, posture and wellness, as represented by block 66. The stiffness of the foam is dynamically controlled to change the stiffness of the seat across the seating surface 18 of the cushion 16. Further, the seat bolsters 30, 32, 34 may be adjusted to provide proper support and maintain comfort, posture and wellness. For example, the side bolsters 30 on the seat bottom 12 may be adjusted in both the lateral direction as well as the upright direction. The front bolster 32 may be moved in the upright direction and fore-aft direction. The side bolsters 34 on the seat back 14 may be adjust in the lateral direction and the fore-aft direction. The temperature of the seat may also be controlled.

At block 66, the seat assembly 10 may be dynamically controlled to maintain the occupant in an expert seating position, or any pressure distribution which fits with any customized occupant position has been registered during driving. Customized or dynamically controlled seat settings may be collected and registered in the knowledge base for use in future dynamic control.

Figure 3:
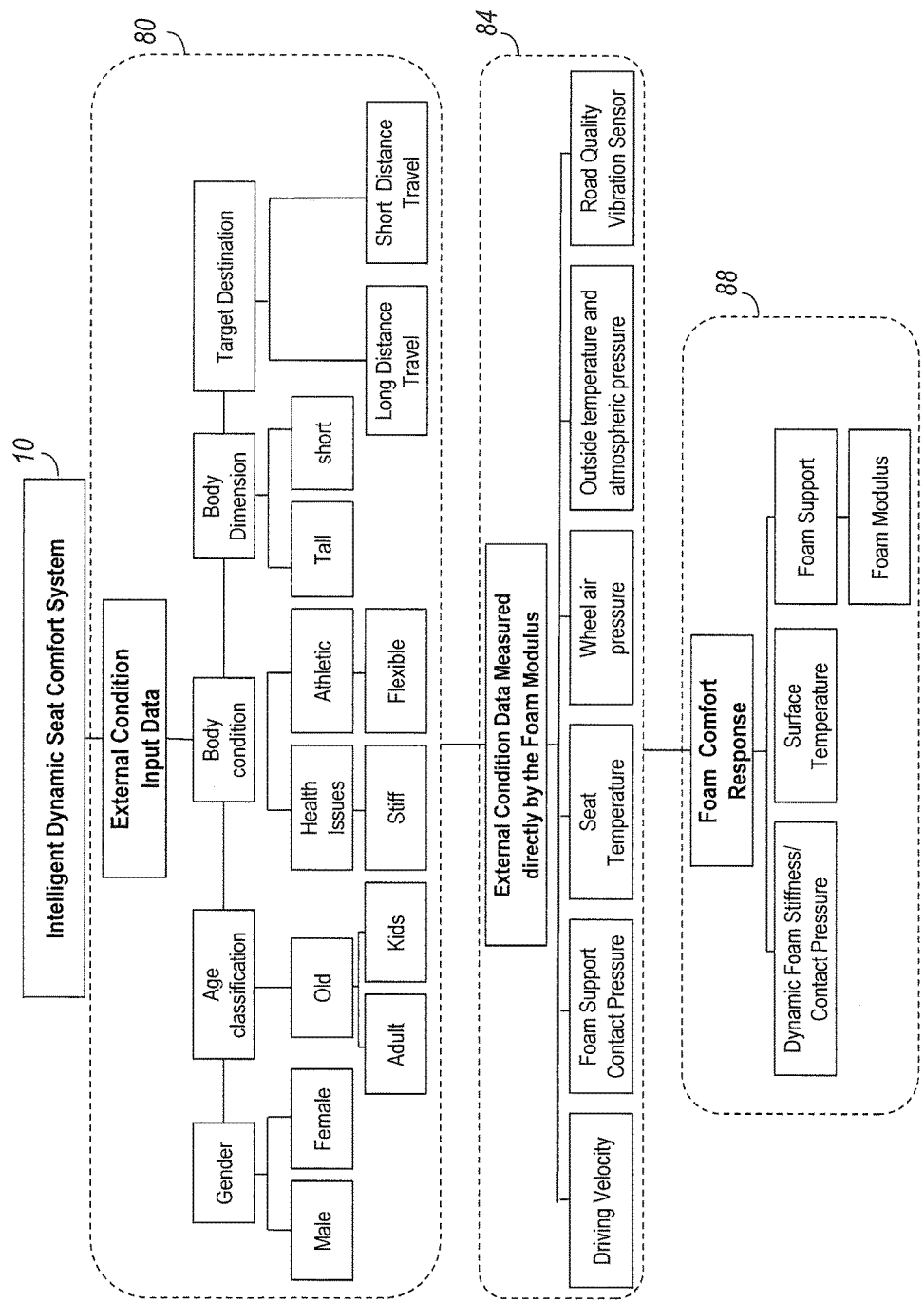
FIG. 3 is a schematic of a system and method for adjusting the vehicle seat according to an embodiment.

As shown in FIG. 3, the seat intelligent seat comfort system 10 utilizes input data 80 that may be input by the passenger. The input data 80 represents conditions that are external to the seat system 10 and can be input by the passenger, such as body dimension, body condition, gender, age and destination target.

The intelligent seat comfort system 10 also utilizes measured data 84. The measured data 84 represents conditions that are external to the seat system 10 and can be measured by sensors in the vehicle. The measured data 84 may also be measured directly by the foam modulus. The measured data 84 includes the driving velocity, foam support contact pressure, seat temperature, wheel air pressure, outside temperature and road vibrations. Other data may also be measured and used by the intelligent seat comfort system 10.

The intelligent seat system 10 then adjusts a foam comfort condition 88. The comfort conditions 88 may include dynamically adjusting the foam stiffness, the surface temperature or the foam modulus.

Based on the input data 80 and measured data 84, the comfort conditions 88 are adjusted dynamically. For example, once the passenger sits in the seat assembly 10, the intelligent seat system 10 will register immediately the seat position, the weight and the contact pressure along the surface of the seat as well the environmental temperature.

When the vehicle is started, the intelligent system will record the vibration acting on the seat, the vibration sensors are alarmed and activated until the driver arrives at the target destination. The controller will control the foam pressure distribution as well the contact surface with the passenger. The intelligent system will receive input and feedback from the driver about the expected target destination, the passenger's age, whether the passenger has health issues. In one example, if the passenger has health issues, the adjustment will be switched into safe mode, allowing gentle modification at the foam areas of the health issue. During driving the intelligent system can still receive feedback from the passenger and achieve homogenous pressure distribution which fits with any driver position which may been registered during the driving.

FIGS. 4-11 illustrate display images from the interface 70 adjusting the seat assembly 10. For example, FIG. 6 illustrates a depiction of the vehicle seat assembly 10 showing a distribution of pressure upon the seat. This visualization may assist an occupant in positioning upon the seat assembly 10 with live visual feedback.

Figure 8:
FIG. 8 is another interface and display image for the vehicle seating system of FIG. 1.
Figure 9:
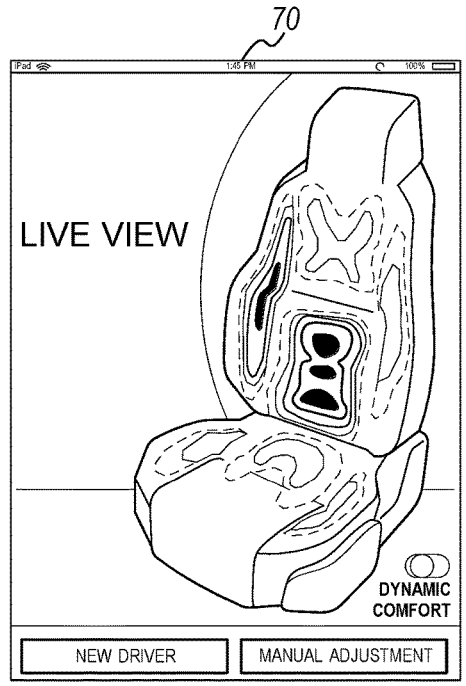
FIG. 9 is another interface and display image for the vehicle seating system of FIG. 1.

In FIG. 8, the seat assembly is automatically and dynamically adjusted for comfort, posture and biomechanically positioning optimized based on the external conditions, such as occupant data, destination information and vehicle data. Selection of the dynamic comfort option measures the pressure in the sensors, and displays a live view, such as in FIG. 9. During the dynamic adjustment, the controller 20 compares the sensor values, and if the controller 20 determines that the occupant seating position has changed or needs adjustment based on the external conditions, the controller 20 varies the pressure in each of the foam cells 22 to adjust the occupant seating position.

Figure 10:
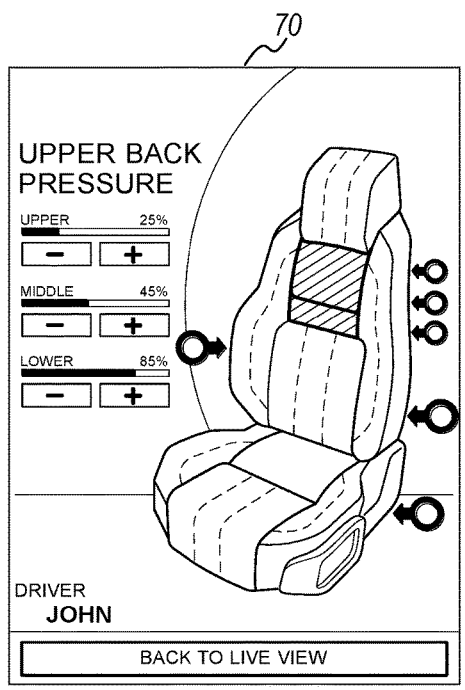
FIG. 10 is another interface and display image for the vehicle seating system of FIG. 1.
Figure 11:
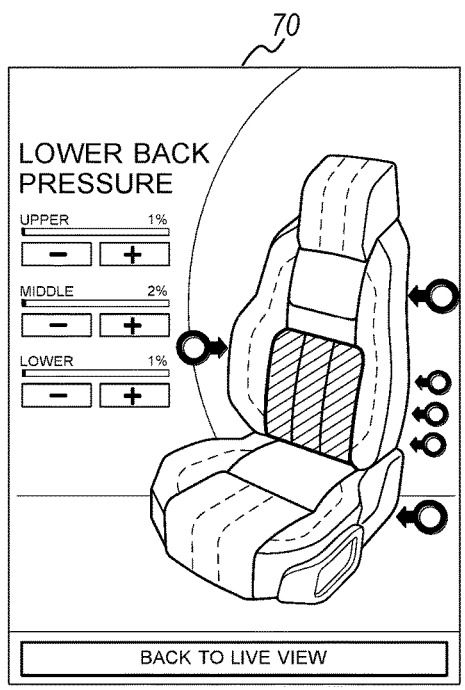
FIG. 11 is another interface and display image for the vehicle seating system of FIG. 1.

FIG. 10-11 illustrates one embodiment where manual adjustment is selected, and the occupant is allowed to select a zone of the seat for adjustment. For example, the occupant may select to adjust individual zones in the seat assembly 10 such as the thoracic zone (FIG. 10), the lumbar zone (FIG. 11) or any zone along the seat bottom 12 or seat back 14. The occupant be permitted may make incremental adjustment of zones or even adjust pressure in each foam cell 22 in a zone.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat bottom;
    a seat back mounted adjacent the seat bottom;
    a cushion disposed on at least one of the seat bottom and seat back and defining a seating surface, the seating surface having a plurality of regions;
    a controller in communication with the cushion and programmed to independently vary a stiffness of each of the regions along the seating surface; and
    a plurality of sensors operably connected to the cushion and in electrical communication with the controller to detect a seating position of an occupant,
    wherein the controller is programmed to dynamically vary the stiffness of the cushion in response to a sensed change in the seating position of the occupant by the plurality of sensors.

2. The seat assembly of claim 1 wherein the plurality of regions comprises a plurality of foam cells formed in the cushion, wherein the stiffness in each of the foam cells is variable independently based on an air pressure in each foam cell.

3. The seat assembly of claim 1 further comprising a rigid pan having a plurality of pan cells, wherein the stiffness in each of the regions is variable independently when each of the pan cells is actuated.

4. The seat assembly of claim 1 wherein stiffness of the cushion in each of the regions is dynamically varied based on an external condition.

5. The seat assembly of claim 4 wherein the external condition is based on destination information.

6. The seat assembly of claim 5 wherein the destination information includes at least one of a travel distance, a travel time, a road condition and an external temperature.

7. The seat assembly of claim 4 wherein the external condition is based on occupant data.

8. The seat assembly of claim 7 wherein the occupant data includes at least one of an occupant age, gender, health condition, weight and psychological condition.

9. The seat assembly of claim 1 wherein the cushion includes at least one adjustable bolster portion, wherein the controller is programmed to dynamically adjust a position of the bolster portion.

* * * * *